J. T. PLASS.
Band Saw Machine.
No. 107,195.
Patented Sept. 6, 1870.
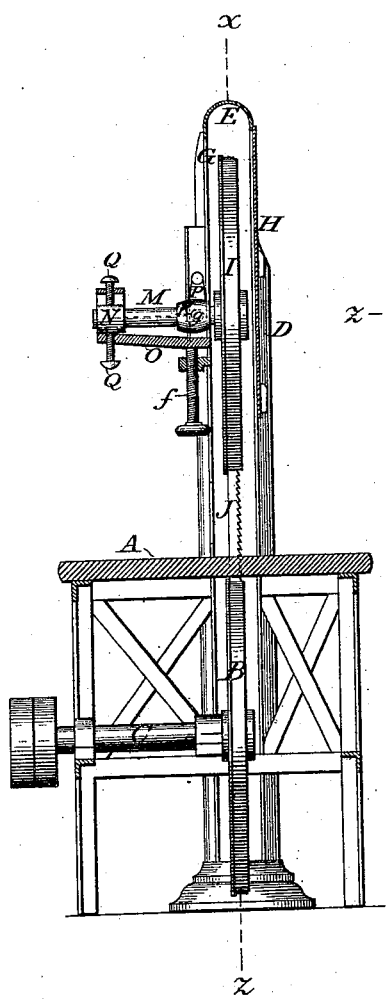
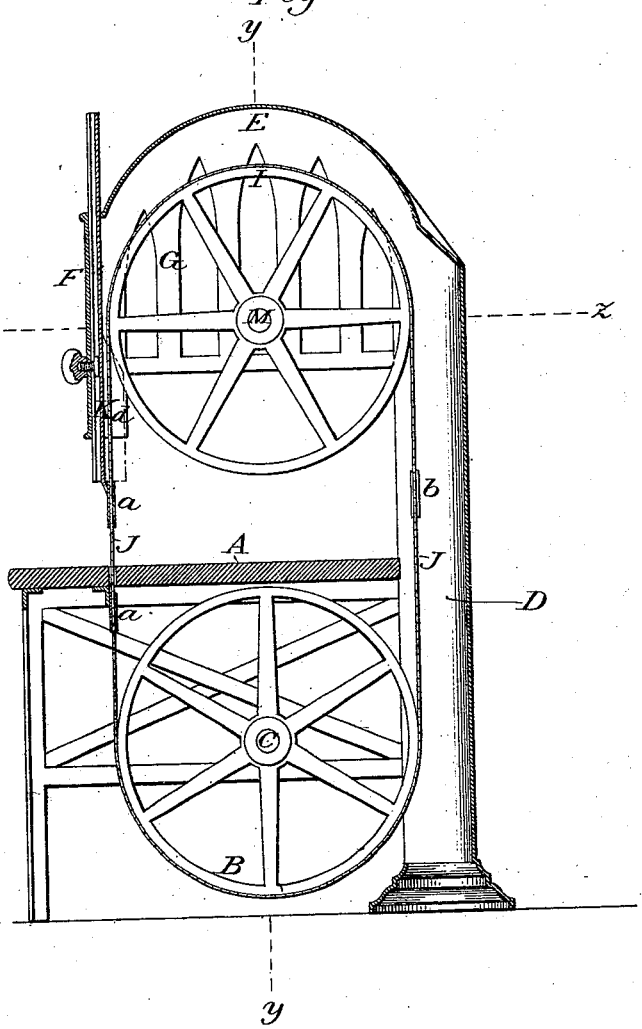
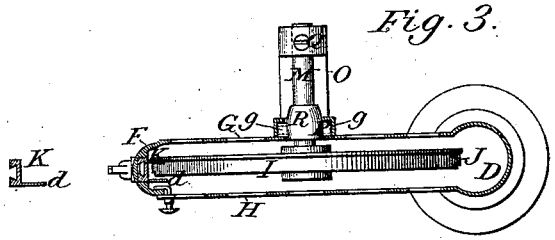
Witnesses:
Fred Haynes
M. J. Shanley
Inventor:
John T. Plass

United States Patent Office.

JOHN T. PLASS, OF NEW YORK, N. Y.

Letters Patent No. 107,195, dated September 6, 1870.

IMPROVEMENT IN SAWING-MACHINE.

The Schedule referred to in these Letters Patent and making part of the same.

To all whom it may concern:

Be it known that I, JOHN T. PLASS, of the city, county, and State of New York, have invented a new and useful Improvement in Band-saw Machines, of which the following is a full, clear, and exact description, reference being had to the accompanying drawing forming part of this specification, and in which—

Figure 1 represents a longitudinal vertical section of a band-saw machine, constructed in accordance with my improvement, the same being taken for the most part, mainly as indicated by the line $x\,x$, in Figure 2, which latter is a transverse vertical section through the line $y\,y$ in fig. 1;

Figure 3 is a horizontal section through the line $z\,z$ in fig. 1; and

Figure 4, a transverse section of the adjustable guide-bar.

Similar letters of reference indicate corresponding parts.

In band-saw machines, as heretofore constructed, the saw has been placed outside of the frame and column which support the driving parts, thereby exposing the saws to injury from handling lumber about them, also rendering them extremely dangerous to the operator, either from breakage or unsound saws, or by the saw sliding off the upper pulley while in motion, and falling upon the operator, from which many serious accidents have occured.

The main feature or object of this improvement has been to produce a machine which shall be perfectly safe to the operator, and fully protect the saw from injury; likewise, combining neatness and utility in all its parts. To these ends, The invention consists in such a construction of the frame and column of the machine, and arrangement in relation thereto of the upper and lower wheels that carry the saw, as that the saw is made to run upward inside the column, under the top arch of the frame, over the upper or tension pulley, that is boxed in at the sides under inclosure, by a gate, to facilitate change of saws, and down inside the front portion of the frame, and behind the guide-bar, which is made vertically adjustable to any required height from the table to suit different thickness of work; and in this provision, as regards safety, the invention includes a flanged construction of such adjustable guide-bar.

Referring to the accompanying drawing—

A represents the table or bench of the machine, beneath which is the lower saw pulley, B, carried by the driving-shaft C, to which power is communicated in any suitable manner, and from any convenient source.

Arranged in line with said pulley, and at the rear of the bench, is a hollow column, D, open up its front, and connecting at its top with a hollow arch, E, open below, and which joins, at its forward end, a vertical hollow front frame or downward extension, F, open up its back.

The space lying between said column D, arch E, and portion F of the frame, is boxed in at the one side by a covering, G, that may be of open-work character, and on the other side by a gate, H, which may be opened to change the saw, and serves to protect the operator in case of breakage or sliding off, the upper or tension pulley I, over which the saw J runs, being within the space thus boxed in, and the column, and frame just described being so arranged as that said pulley projects on opposite sides of its periphery within the column D and portion F of the frame, also enters at its top, or lies immediately below the hollow arch E.

Furthermore, the column D is so arranged as that the lower pulley B is made to enter it at its periphery.

By this construction and arrangement of parts, the saw J is made to run upward inside the column D, under the arch E, over the upper or tension pulley I, and down inside the front frame F, and behind the guide-bar K, which latter is made adjustable up and down to the required height for the work to be done, the saw, in such course or travel, being steadied and directed by upper and lower front guides $a\,a$, and a back guide, $b$, arranged within the column, the same serving to guide equally well all widths of saws.

By the saw being arranged to run inside of the frame and column which support the driving parts, it is protected from injury when handling lumber about it, also danger to the operator, from breakage or slipping of the saw from off the upper pulley, is avoided; and to further contribute to the safety of the operator from such cause or causes, and this, too, where injury is the most liable to be inflicted, I construct the guide-bar K on the tooth side of the saw, and for some distance upward from the bottom of said bar, with a protecting flange, $d$, which in practice is found to be a most important safe-guard.

The upper pulley-shaft M is held in oscillating, yielding, and adjustable bearings, arranged so that the same can easily be set to accommodate the running of the saw, and serving to adjust the machine to carry or run different widths of saws.

Thus said shaft is supported at its outer end in a vertically sliding box or bearing, N, adjustable by set-screws $e\,e$, up or down, within a bracket, O, carried by or connected with a vertical slide or sliding frame, P, adjustable from below by a screw, $f$, and carrying, under support of transverse trunnions $g$, an inner bearing, R, to said shaft.

What is here claimed, and desired to be secured by Letters Patent, is—

1. The arrangement, substantially as specified, of the hollow open column D, the upper arch E, and forward portion F of the frame, with the upper and lower saw-carrying pulleys I and B, and sides or side and gate G H to said frame, for directing the run of the saw under cover and behind the guide-bar K, substantially as specified.

2. The guide-bar K, constructed or provided with a protecting flange, $d$, arranged in relation to the saw and its bench or table, essentially as described.

JOHN T. PLASS.

Witnesses:
FRED. HAYNES,
HENRY PALMER.